United States Patent
Turner et al.

(10) Patent No.: US 6,318,676 B1
(45) Date of Patent: Nov. 20, 2001

(54) EQUATORIAL-NORMAL BODY-STABILIZED SPACECRAFT AND CONTROL METHOD FOR INCLINED ORBIT OPERATION

(75) Inventors: Andrew E. Turner, Mountain View; David F. Ford, Watsonville; Jeffrey D. Stoen, Palo Alto, all of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/480,066

(22) Filed: Jan. 10, 2000

(51) Int. Cl.$^7$ ........................................... B64G 1/28
(52) U.S. Cl. ................................................. 244/165
(58) Field of Search ................................. 244/164, 165, 244/168, 171; 701/4, 13, 222, 221; 342/359

(56) References Cited

U.S. PATENT DOCUMENTS

| | | | | |
|---|---|---|---|---|
| 4,374,579 | * | 2/1983 | Renner et al. | 244/164 |
| 5,738,309 | * | 4/1998 | Fowell | 244/171 |
| 6,076,774 | * | 6/2000 | Shah et al. | 244/164 |

* cited by examiner

*Primary Examiner*—Galen L. Barefoot
(74) *Attorney, Agent, or Firm*—Kenneth W. Float

(57) ABSTRACT

A control method and improved equatorial-normal body-stabilized spacecraft that operates in an inclined orbit. The control method controls pointing of payloads (communication antennas and instruments) and solar arrays disposed on the spacecraft. The method controls the spacecraft to provide Earth-pointing payloads and sun-pointing solar arrays so that the spacecraft body and solar arrays each rotate only around a single axis, a pitch axis of the spacecraft.

11 Claims, 6 Drawing Sheets

EQUATORIAL-NORMAL BODY-STABILIZED SPACECRAFT AND CONTROL METHOD FOR INCLINED ORBIT OPERATION

BACKGROUND

The present invention relates generally to spacecraft and control methods therefor, and more particularly, to an equatorial-normal body-stabilized spacecraft that operates in an inclined orbit and a method of controlling the spacecraft.

The assignee of the present invention manufactures and deploys communication satellites or spacecraft that orbit the Earth. Heretofore, certain spacecraft have been launched and positioned in geosynchronous equatorial or non-inclined orbits. In such geosynchronous equatorial or non-inclined orbits, the spacecraft is controlled to point its payload (communication antennas or instruments) at the Earth and point its solar arrays at the sun. When the spacecraft is positioned in a geosynchronous equatorial or non-inclined orbit, it is controlled to maintain sun pointing by rotating the body of the spacecraft around a single axis, which is the pitch axis. The pitch axis is normal to the orbit plane.

However, for conventional spacecraft positioned in inclined orbits, control is achieved by rotating or steering the spacecraft about two axes, the pitch and yaw axes, to maintain Earth and sun pointing. This is referred to as yaw steering.

It is an objective of the present invention to provide for an equatorial-normal body-stabilized spacecraft that operates in an inclined orbit. It is another objective of the present invention to provide for an equatorial-normal body-stabilized spacecraft that operates in an inclined orbit that is controlled to provide Earth-pointing payloads and sun-pointing solar arrays wherein the spacecraft body and solar arrays each rotate only around a single axis. It is another objective of the present invention to provide for an improved method of controlling a spacecraft to provide payload pointing with minimal spacecraft rotation, in that all large-angle spacecraft rotation occurs around the pitch axis.

SUMMARY OF THE INVENTION

To accomplish the above and other objectives, the present invention provides for an equatorial-normal body stabilized spacecraft that operates in an inclined orbit. A control method is used that controls pointing of payloads (communication antennas and instruments) and solar arrays disposed on the spacecraft. The spacecraft is controlled to provide Earth-pointing payloads and sun-pointing solar arrays in a manner such that the spacecraft body and solar arrays each rotate only around a single axis.

More particularly, the spacecraft body is controlled to rotate only around the pitch axis of the spacecraft, which is aligned nominally in a north-south direction. The solar arrays are also controlled to rotate only around the pitch axis of the spacecraft.

In using the present invention, spacecraft communications payload antennas have a footprint on the surface of the Earth that undergoes minimal rotation due to spacecraft motion. This improves upon conventional yaw steered spacecraft that have a yaw rotation of as little as 0 degrees to as much as 180 degrees daily during yaw steering operation.

Using the present invention, the spacecraft communications payload antenna footprint undergoes minimal rotation due to orbital and attitude motion, enabling spot beams to be precisely targeted to small geographical regions with high traffic. Attitude motion of the spacecraft body with respect to the sun is also minimized, thus simplifying the layout of sun sensors used for attitude control, and simplifies rotation of the solar arrays

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
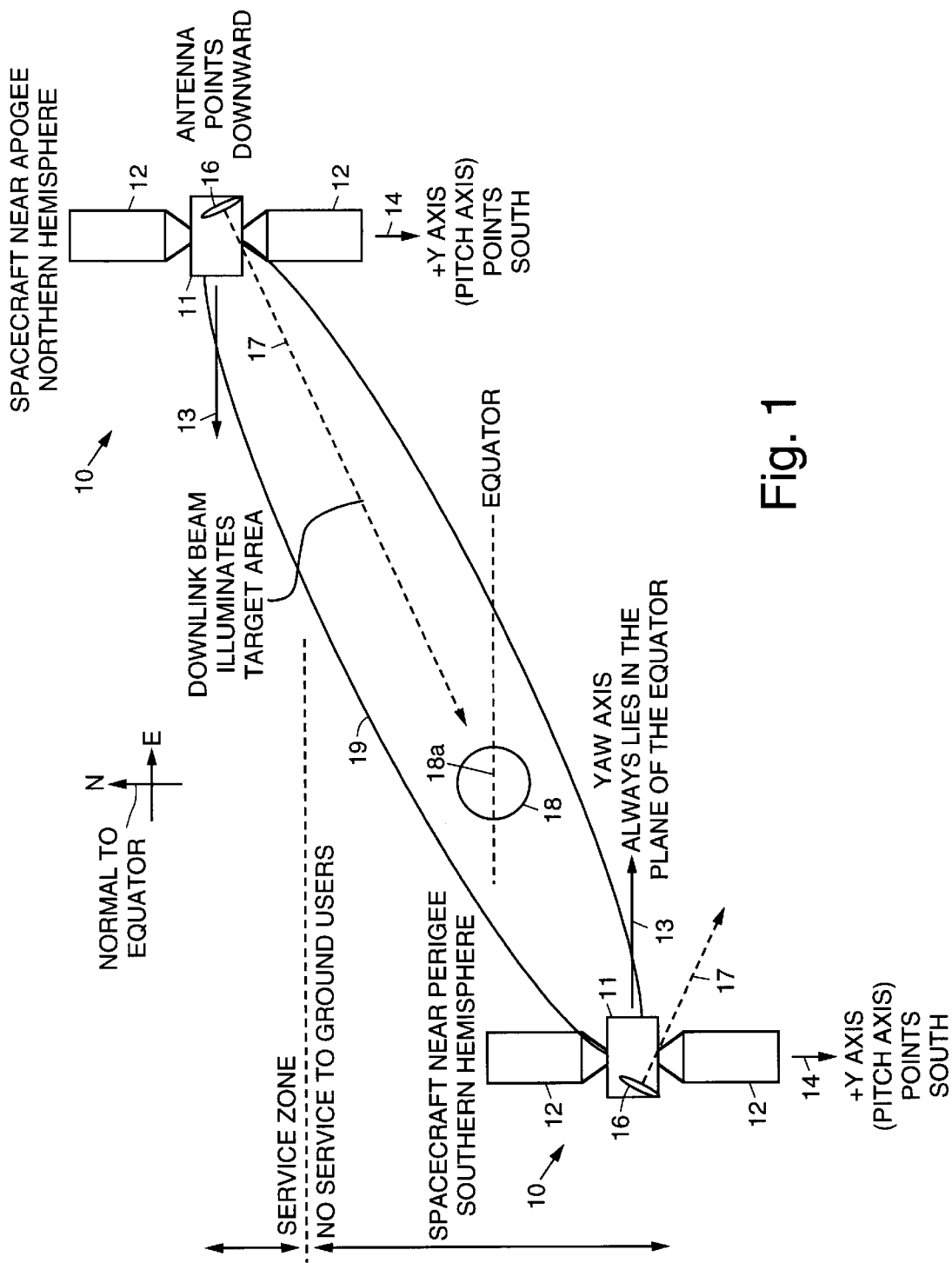
FIG. 1 illustrates a block diagram of an exemplary equatorial-normal body-stabilized spacecraft in accordance with the principles of the present invention that operates in an inclined orbit.

Referring to the drawing figures, FIG. 1 illustrates a block diagram of an exemplary equatorial-normal body-stabilized spacecraft 10 in accordance with the principles of the present invention that operates in an inclined orbit 19 around the Earth 18.

The spacecraft 10 has a body 11 that rotates around a pitch axis 14, which is generally aligned along a North-South direction through the body 11. The spacecraft 10 has a yaw axis 13 that always lies in a plane that is parallel to the equator 18a of the Earth 18 when orbiting the Earth 18. The roll axis 15 (FIG. 2) of the spacecraft 10 is normal to both the yaw and pitch axes 13, 14, and points in the general direction of the spacecraft motion around the orbit 19.

Attached to the body 11 are two solar arrays 12 that extend away from the body 11 along the north and south direction. Also attached to the body 11 is a payload 16, shown as an antenna 16, that has a pointing direction 17 that points downward relative to the yaw axis 13 toward the earth when the spacecraft 10 is in the northern hemisphere. The antenna 16 points away from the Earth 18 when the spacecraft 10 is in the southern hemisphere.

The spacecraft 10 is closer to the Earth 18 when it is in the southern hemisphere than it is in the northern hemisphere. Since the spacecraft 10 is at higher altitude when it is over the northern hemisphere, it can cover a wider region of the surface of the Earth 18. Thus, the spacecraft 10 operates to provide service when it is in the northern hemisphere and provides no service when it is in the southern hemisphere.

FIG. 1 also shows that the side of the spacecraft 10 with the +Y-axis (pitch axis) 14 is directed toward the earth 18 when the spacecraft 10 is in the northern hemisphere and is more distant from the earth 18. The earth 18 emits infrared radiation that can cause undesirable heating of a spacecraft 10, particularly when the spacecraft 10 is near the earth 18.

The face of the spacecraft from which the +Y-axis (pitch axis) emerges is never directed toward the earth 18 when this infrared radiation is near its maximum intensity. Therefore, only moderate thermal protection is required on this face. The opposite face of the spacecraft 10, which lies in the opposite direction to the +Y-axis (pitch axis), is directed toward the earth when maximum earth 18 infrared radiation is encountered. Maximum thermal protection can be applied to this single face of the spacecraft 10.

Figure 2:
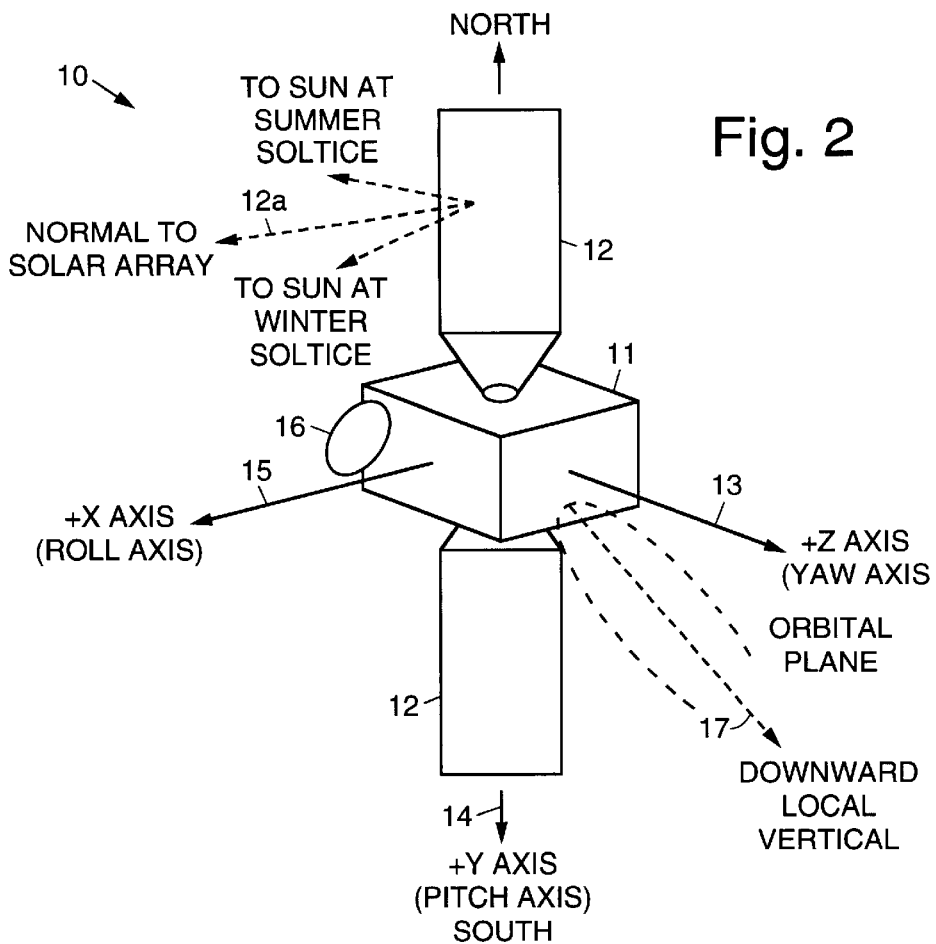
FIG. 2 illustrates details of the spacecraft shown in FIG. 1.

FIG. 2 illustrates details of the spacecraft 10 shown in FIG. 1. FIG. 2 shows that the two solar arrays 12 are rotated around the pitch axis 14 (North-South direction) during the orbit of spacecraft 10. The solar arrays 12 are rotated to point in the general direction of the sun. Specifically, the normal to each solar array 12a is maintained parallel to the component of the sun-vector that lies in the plane of the earth's equator 18a. FIG. 2 also shows that the sun-vector can make a small but significant angle with respect to the plane of the equator 18a. This angle reaches its maximum magnitude of 23.4 degrees at winter solstice and summer solstice. No steering of the solar array 12 is undertaken to compensate for this small motion out of the equatorial plane, therefore there is a small reduction in electrical power generated by the solar array, which amounts to less than 10% of its capacity. Spacecraft already functioning in non-inclined or equatorial orbits are operated in this manner, and experience a similar reduction in solar array power output at the solstices.

Figure 3:
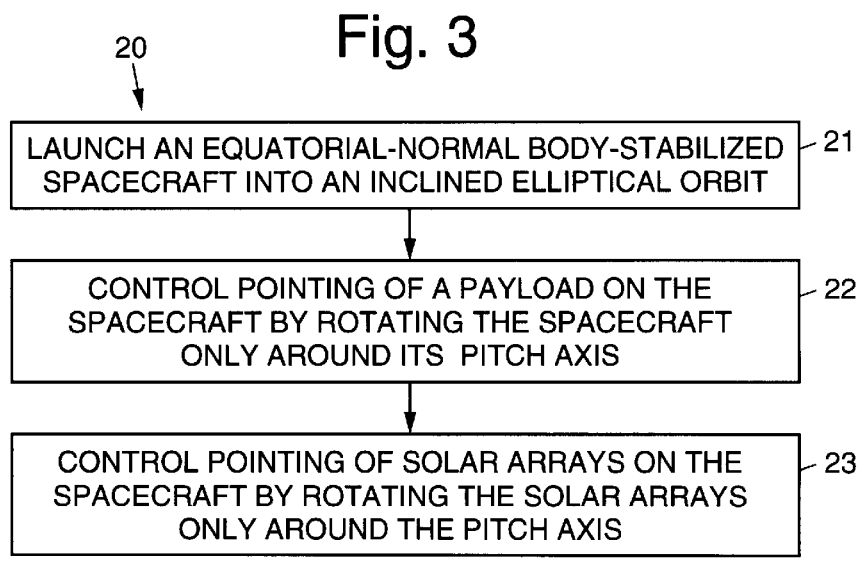
FIG. 3 is a flow diagram that illustrates a spacecraft control algorithm or method in accordance with the principles of the present invention.

FIG. 3 is a flow diagram that illustrates a spacecraft control algorithm 20 or method 20 in accordance with the principles of the present invention. The control method 20 is used to control an equatorial-normal body-stabilized spacecraft 10 comprising a payload 16 and one or more solar arrays 12.

The control method 20 comprises the following steps. The equatorial-normal body-stabilized spacecraft 10 is launched 21 into an inclined elliptical orbit 19 about a body, such as the Earth 18. Pointing of the payload 16 is achieved by rotating 22 the spacecraft 10 about the pitch axis 14. Pointing of the solar arrays 12 is also achieved by rotating 23 them about the pitch axis 14.

The control method 20 thus controls pointing of payloads 16 (communication antennas and instruments) and solar arrays 12 disposed on the spacecraft 10. The spacecraft 10 is controlled to provide Earth-pointing payloads 16 and sun-pointing solar arrays 12 in a manner such that the spacecraft body 11 and solar arrays 12 each rotate only around a single axis, namely the pitch axis 14.

The body 11 is controlled to rotate only around the pitch axis 14 of the spacecraft 10, which is aligned nominally in a north-south direction through the spacecraft 10. The solar arrays 12 are also controlled to rotate only around the pitch axis 14 of the spacecraft 10.

When using the control method 20, spacecraft communications payloads 16 or antennas 16 have a footprint on the surface of the Earth 18 that undergoes minimal rotation due to motion of the spacecraft 10. This improves upon conventional yaw steered spacecraft that rotate on the order of 90 degrees or more during yaw steering maneuvers.

The footprint of the payload 16 or antenna 16 undergoes minimal rotation due to orbital and attitude motion, enabling spot beams to be precisely targeted to small geographical regions. Attitude motion of the spacecraft body 11 with respect to the sun is also minimized. This simplifies the layout of sun sensors used for attitude control, and minimizes rotation of the solar arrays 12.

Figure 4:
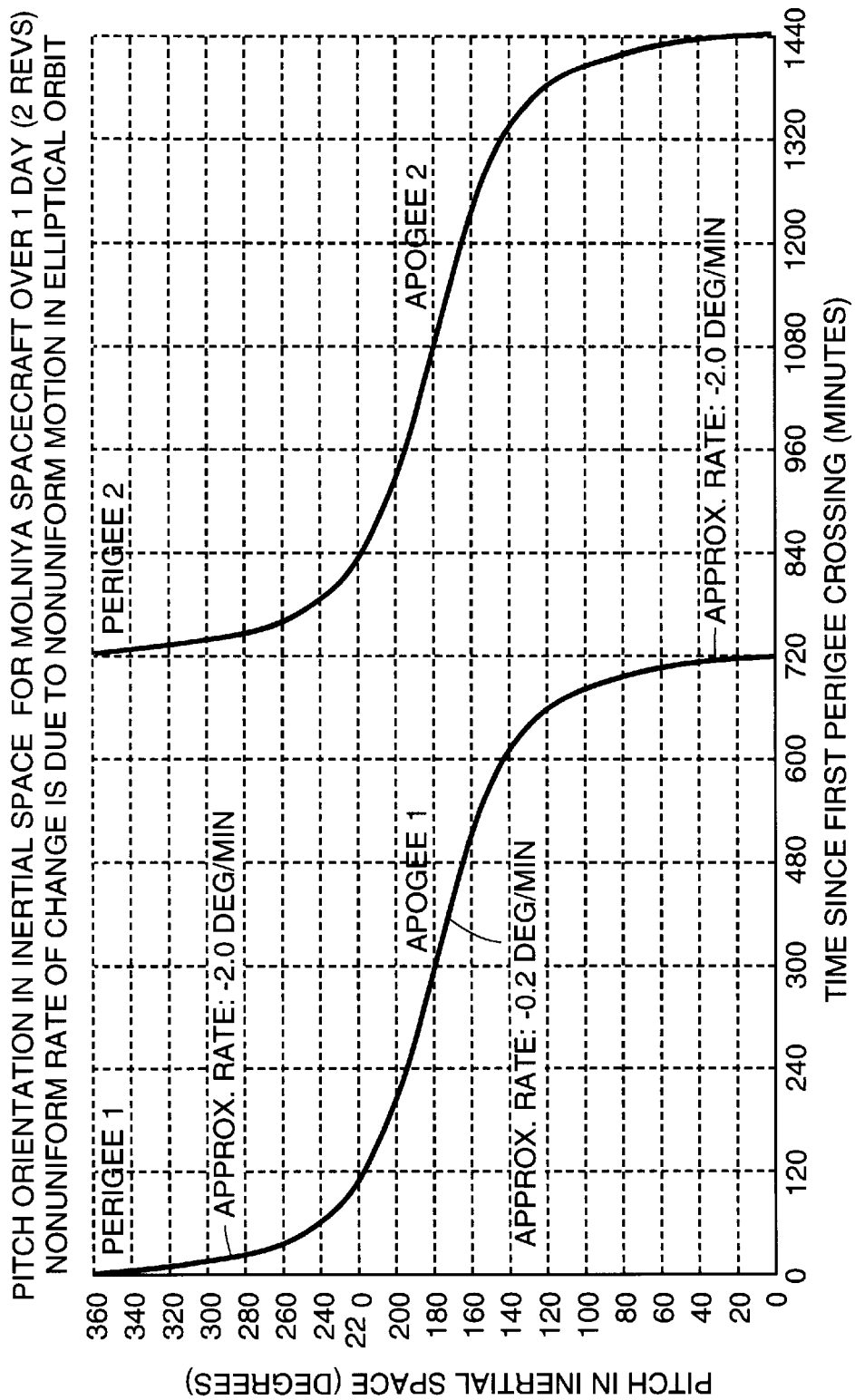
FIG. 4 is a graph that illustrates pitch orientation in inertial space for an exemplary spacecraft over a one day period.
Figure 5:
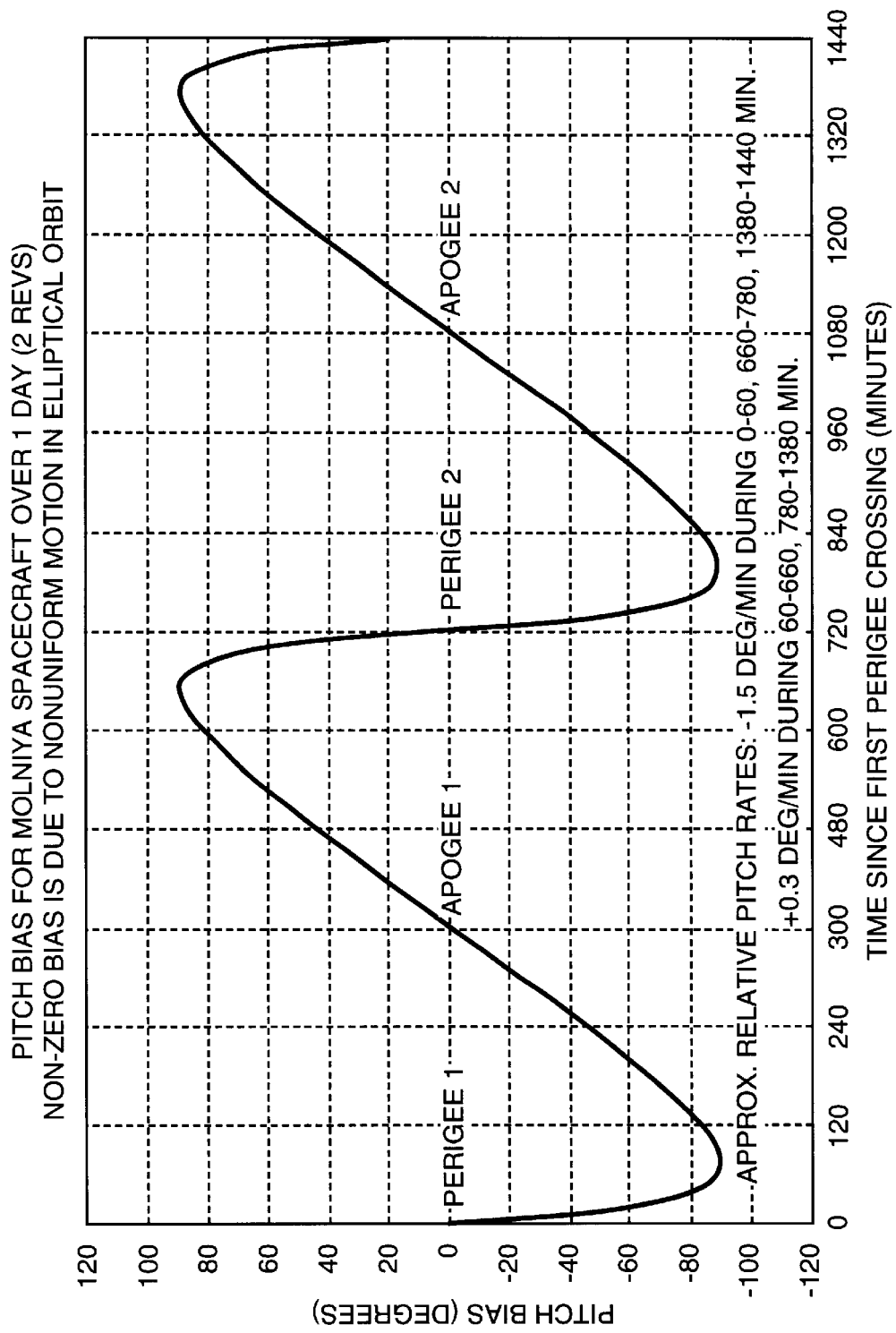
FIG. 5 is a graph that illustrates pitch bias for an exemplary spacecraft over a one day period.
Figure 6:
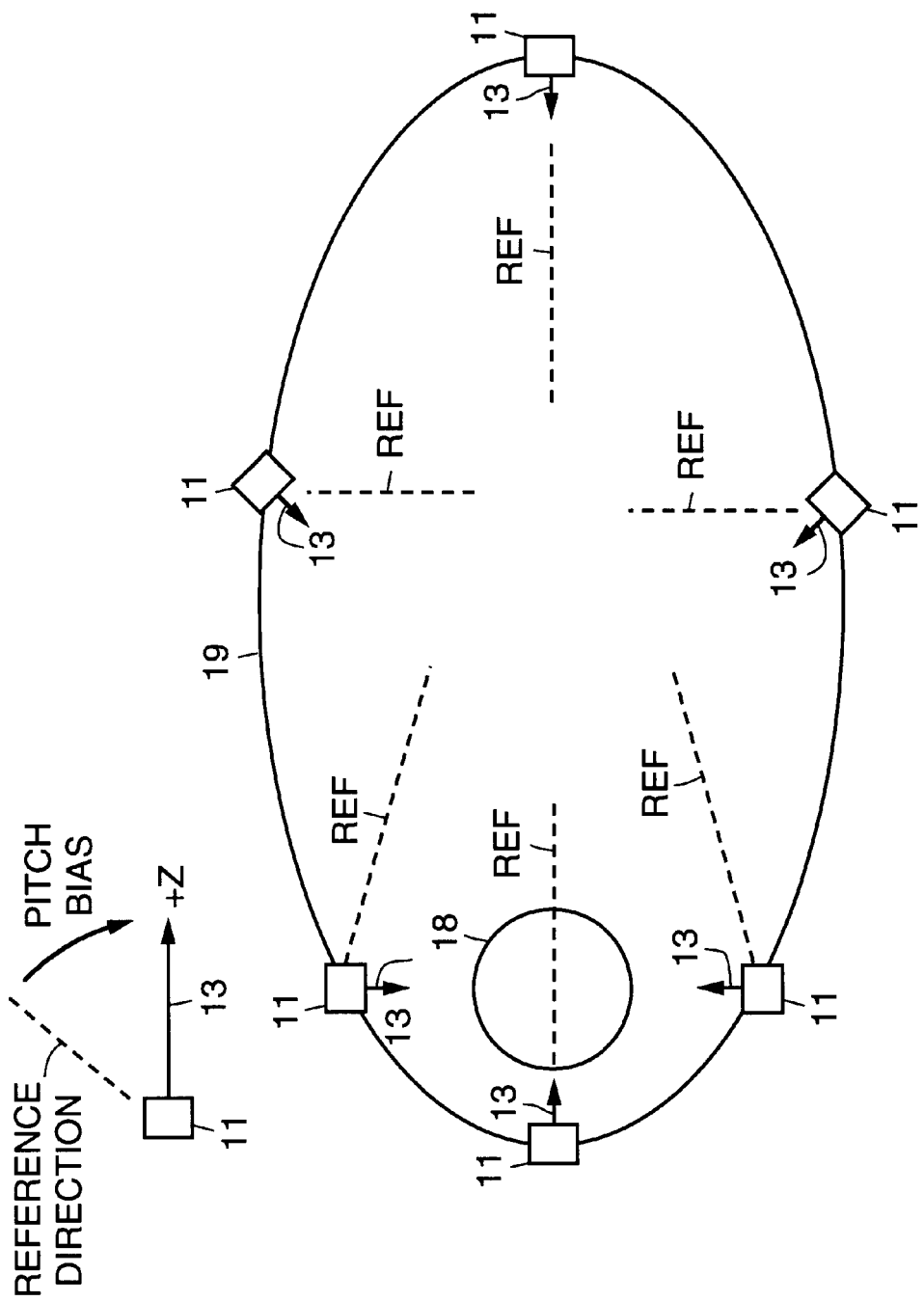
FIG. 6 illustrates pitch orientation of an exemplary spacecraft at various points in its orbit.

FIGS. 4, 5 and 6 provide background on the pitch motion of the spacecraft 10 as it moves around an exemplary Molniya elliptical orbit and maintains the yaw axis 13 in the general direction of the earth 18. Each displays the same conditions at the same points in time, but three different perspectives are used.

FIG. 4 displays the rate of motion of the spacecraft body 11 around the pitch axis 14, or pitch rate from the perspective of a non-rotating or inertial reference frame. FIG. 4 shows that the pitch motion is monotonic or always in the same direction. The most rapid pitch motion occurs near the perigee of the orbit 19 (FIG. 1), where orbital motion is at its maximum rate, which has a magnitude of about 2.0 degrees per minute. The slowest pitch motion occurs near apogee (FIG. 1), where orbital motion is at its minimum rate, which has a magnitude of about 0.2 degrees per minute. The mean or average rate of pitch motion, or mean pitch rate, has a magnitude of about 0.5 degrees per minute.

FIG. 5 displays the, notion of the spacecraft body 11 as viewed from a rotating coordinate system. This rotating coordinate system rotates at a rate equal to the mean pitch rate of the spacecraft body 11, which has a magnitude of about 0.5 degrees per minute. The pitch bias equals the angle between the actual spacecraft orientation around the pitch axis 14, and the orientation that would occur if the spacecraft rotated around the pitch axis at the mean rate. The pitch bias is shown schematically in FIG. 6.

In the perigee region of the orbit 19 the spacecraft 10 rotates at a rate with magnitude exceeding the mean rate. This causes a pitch bias to increase in magnitude throughout the perigee region of the orbit 19. In the apogee region, the pitch rate magnitude is below the mean rate, which removes the pitch bias generated in the perigee region and generates a pitch bias in the opposite direction of equal magnitude. At the perigee and apogee crossings the pitch bias is nearly zero, which FIGS. 5 and 6 confirm.

In the actual operation of the spacecraft 10, the pitch bias is actively controlled by the control method 20 shown in FIG. 3. Once the spacecraft 10 is launched 21 into the proper orbit 19, the pitch motion is initiated at the mean rate. The pointing control 22 adjusts the magnitude of the pitch rate to maintain the proper pitch bias to point the yaw axis 13 in the general direction of the Earth 18.

Figure 7:
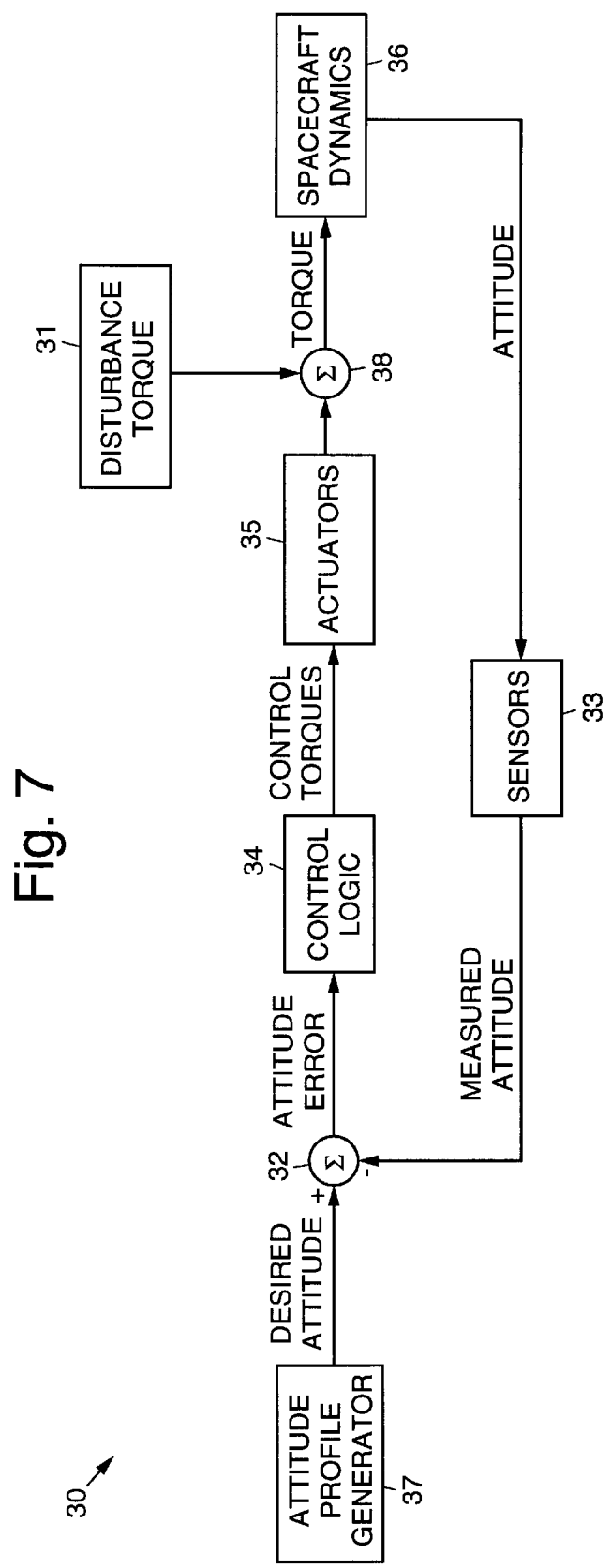
FIG. 7 illustrates an exemplary control system employed in controlling the spacecraft.

FIG. 7 illustrates an exemplary control system 30 employed in controlling the spacecraft 10 to implement the control method 20. The control system 30 uses sensors 33 to measure the attitude of the spacecraft whose motion is influenced by torques that are a combination 38 of disturbance torques 31 including solar torques, magnetic torques and gravity gradient torques, for example, and control torques from actuators 35. The pitch bias angle between the desired spacecraft orientation and the orientation that would occur if the spacecraft 10 rotated at the mean rate, or zero pitch angle, is supplied by the attitude profile generator 37. The roll and yaw angles are nominally zero, although the profile generator could be configured to supply non-zero functions for any of roll, pitch, or yaw if needed.

The measured attitude, supplied by the sensors 33, such as one or more earth sensors, star sensors or sun sensors, for example, is subtracted in a combiner 32 from the desired attitude supplied by the attitude profile generator 37. This provides the attitude error used by the control logic 34 to produce a requested control torque to correct the attitude error.

The control logic 34 maintains the orientation of the spacecraft 10 around the pitch axis 14 so that the yaw axis 13 (+Z axis) is parallel to the component of the spacecraft-Earth vector in the plane of the equator 18a. The output of the control logic 34 is applied to one or more actuators 35 that orient the body 11 of the spacecraft 10. The actuators 36 may comprise momentum wheels, reaction wheels, thrusters or magnetic torquers, for example. Thus, pointing 22 of the payloads 16 on the spacecraft 10 may be achieved by actuating momentum wheels, reaction wheels, thrusters or magnetic torquers to rotate the body 11 of the spacecraft 10. The outputs of the actuators 35 feed back through the spacecraft dynamics 36 to close the control loop implemented by the control system 30.

The following discussion is provided in order that the importance of the present invention be better understood. On geosynchronous spacecraft, a large number of antennas are typically directed earthward, including antennas of different types, shapes, and pointing directions. For example, the antenna farm on a single spacecraft could provide broad "hemispherical" beams that cover entire continents, narrow "spot" beams that might target an individual metropolitan area, and "zone" beams of intermediate size. Some of these beams are carefully shaped to steer a strong signal into a customer's territory and minimize spillover into other regions.

For non-geosynchronous spacecraft 10 in inclined orbits, the antenna footprint tends to not only translate across the surface of the Earth 18, but also undergoes rotation through a large angle. The antenna farm of a typical geosynchronous spacecraft is incompatible with this condition, because the individual antenna beams will wander far from their intended target regions on the surface of the Earth 18. One solution is to use fewer antennas and mount them on rotary joints capable of a full 360 degree rotation. Another is to use electronic steering, which could involve phased array antennas.

The advantage of using equatorial-normal steering implemented using the present invention is that the diverse antenna farm on a geosynchronous spacecraft can be integrated into a spacecraft in a Molniya or related orbit with little or no modification, reducing fabrication costs, simplifying the design and layout, and improving reliability.

The direction to a fixed point on the surface of the Earth 18 relative to the spacecraft 10 changes by about 2 degrees in the north-south direction while the spacecraft 10 traverses the active region of the orbit 19. To maintain the coverage footprint in a conventional manner, the spacecraft body 11 could be rotated around the roll axis 15 (+X axis) by about 2 degrees during this time. An alternative conventional method would be to rotate the spacecraft antenna 16 by a similar angle around the roll axis 15.

When using the present invention, the spacecraft 10 remains vertical, with the pitch axis 14 pointing due south, or departs from the vertical only by a small angle, on the order of 2 degrees. If the spacecraft 10 departs from the vertical, the only significant rotation is around the spacecraft roll axis 15. This small rotation results in only a minor reduction of solar array power output, less than 2 percent. A rotation of this small magnitude can be accomplished without a significant modification of the control method 20 shown in FIG. 3 or the exemplary control system 30 shown in FIG. 7. Spacecraft 10 currently functioning in non-inclined or equatorial orbit can achieve rotations of 2 degrees magnitude or greater around the roll axis while the payload is operating. Alternatively, the spacecraft 10 might remain vertical and the antenna 16 could be rotated around the roll axis 15 by about 2 degrees to optimize pointing.

Equatorial-normal steering preserves the orientation of the spacecraft antenna footprint on the surface of the Earth 18, enabling a diverse antenna farm to be incorporated into the design of the spacecraft 10. Alternative conventional methods of steering the spacecraft would generate a rotation of the coverage footprint if the spacecraft included a diverse antenna farm where each element is incapable of independent steering around the spacecraft yaw axis.

Thus, improved control methods for use in controlling the attitude of a spacecraft has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A control method for use in controlling the attitude of a spacecraft, comprising the steps of:

launching an equatorial-normal body-stabilized spacecraft into an inclined orbit while the spacecraft pitch axis is maintained in a substantially North-South direction;

pointing a payload disposed on the spacecraft by rotating the spacecraft body about its pitch axis; and pointing one or more solar arrays disposed on the spacecraft by rotating the one or more arrays about the pitch axis.

2. The method recited in claim 1 wherein the step of pointing the payload comprises actuating momentum wheels disposed on the spacecraft.

3. The method recited in claim 1 wherein the step of pointing the payload actuating reaction wheels disposed on the spacecraft.

4. The method recited in claim 1 wherein the step of pointing the payload comprises actuating thrusters disposed on the spacecraft.

5. The method recited in claim 1 wherein the step of pointing the payload comprises actuating magnetic torquers disposed on the spacecraft.

6. The method recited in claim 1 wherein the step of launching the spacecraft comprises launching the spacecraft into an inclined orbit while the spacecraft pitch axis is maintained within a relatively small angle on the order of two degrees of the North-South direction.

7. An equatorial-normal body-stabilized spacecraft comprising:

a spacecraft body;

a payload disposed on the body;

one or more solar arrays disposed on the body; and a control system that controls the attitude of spacecraft to have an inclined orbit, points the payload by rotating the spacecraft body about its pitch axis, and points the one or more solar arrays by rotating the one or more arrays about the pitch axis.

8. The spacecraft recited in claim 7 wherein the control system comprises one or more momentum wheels for pointing the payload.

9. The spacecraft recited in claim 7 wherein the control system comprises one or more reaction wheels for pointing the payload.

10. The spacecraft recited in claim 7 wherein the control system comprises one or more thrusters for pointing the payload.

11. The spacecraft recited in claim 7 wherein the control system comprises one or more magnetic torquers for pointing the payload.

* * * * *